(12) United States Patent  
Saccucci

(10) Patent No.: US 7,059,672 B2
(45) Date of Patent: Jun. 13, 2006

(54) BICYCLE SEAT

(75) Inventor: Darcy Saccucci, Coquitlam (CA)

(73) Assignee: MacNeil Bikes, Inc., Burnaby ( * ) Notice: Subject to any disclaimer, the term of this patent is extended or adjusted under 35 U.S.C. 154(b) by 0 days.

(21) Appl. No.: 11/071,965

(22) Filed: Mar. 4, 2005

(65) Prior Publication Data

US 2005/0146173 A1 Jul. 7, 2005

Related U.S. Application Data

(63) Continuation of application No. 10/655,241, filed on Sep. 3, 2003, now Pat. No. 6,899,389.

(51) Int. Cl.
*B62J 1/00* (2006.01)

(52) U.S. Cl. .............................. 297/195.1; 297/215.14; 297/215.15

(58) Field of Classification Search ............. 297/195.1, 297/201, 202, 215.13, 215.14, 215.15, 215.16
See application file for complete search history.

(56) References Cited

U.S. PATENT DOCUMENTS

| | | | | |
|---|---|---|---|---|
| 584,637 A | * | 6/1897 | Jarvis | 297/202 |
| 623,238 A | * | 4/1899 | Davis | 297/200 |
| 3,992,054 A | * | 11/1976 | Campagnolo | 297/215.15 |
| 4,155,590 A | * | 5/1979 | Cunningham | 297/215.15 |
| 4,568,121 A | * | 2/1986 | Kashima | 297/215.15 |
| 4,877,286 A | * | 10/1989 | Hobson et al. | 297/215.13 |
| 5,244,301 A | * | 9/1993 | Kurke et al. | 297/215.15 |
| 5,465,634 A | * | 11/1995 | Chen | 280/279 |
| 5,921,624 A | * | 7/1999 | Wu | 297/215.14 |
| 5,979,978 A | * | 11/1999 | Olsen et al. | 297/215.15 |
| 6,702,376 B1 | * | 3/2004 | Shen | 297/215.15 |

* cited by examiner

*Primary Examiner*—Peter R. Brown
(74) *Attorney, Agent, or Firm*—William L Paradice, III

(57) ABSTRACT

A bicycle seat assembly includes a tubular seat post having an upper serrated surface, a threaded aperture formed in the upper serrated surface and aligned with a longitudinal axis of the tubular seat post, a saddle support structure having a lower serrated surface adapted to mate with the upper serrated portion of the tubular seat post, the lower serrated portion including a slot through which a bolt can extend and mate with the threaded aperture, and a saddle adapted to mate with an upper surface of the saddle support, the saddle having a slit formed therein that allows access to the head of the bolt from above the saddle via the slit.

15 Claims, 8 Drawing Sheets

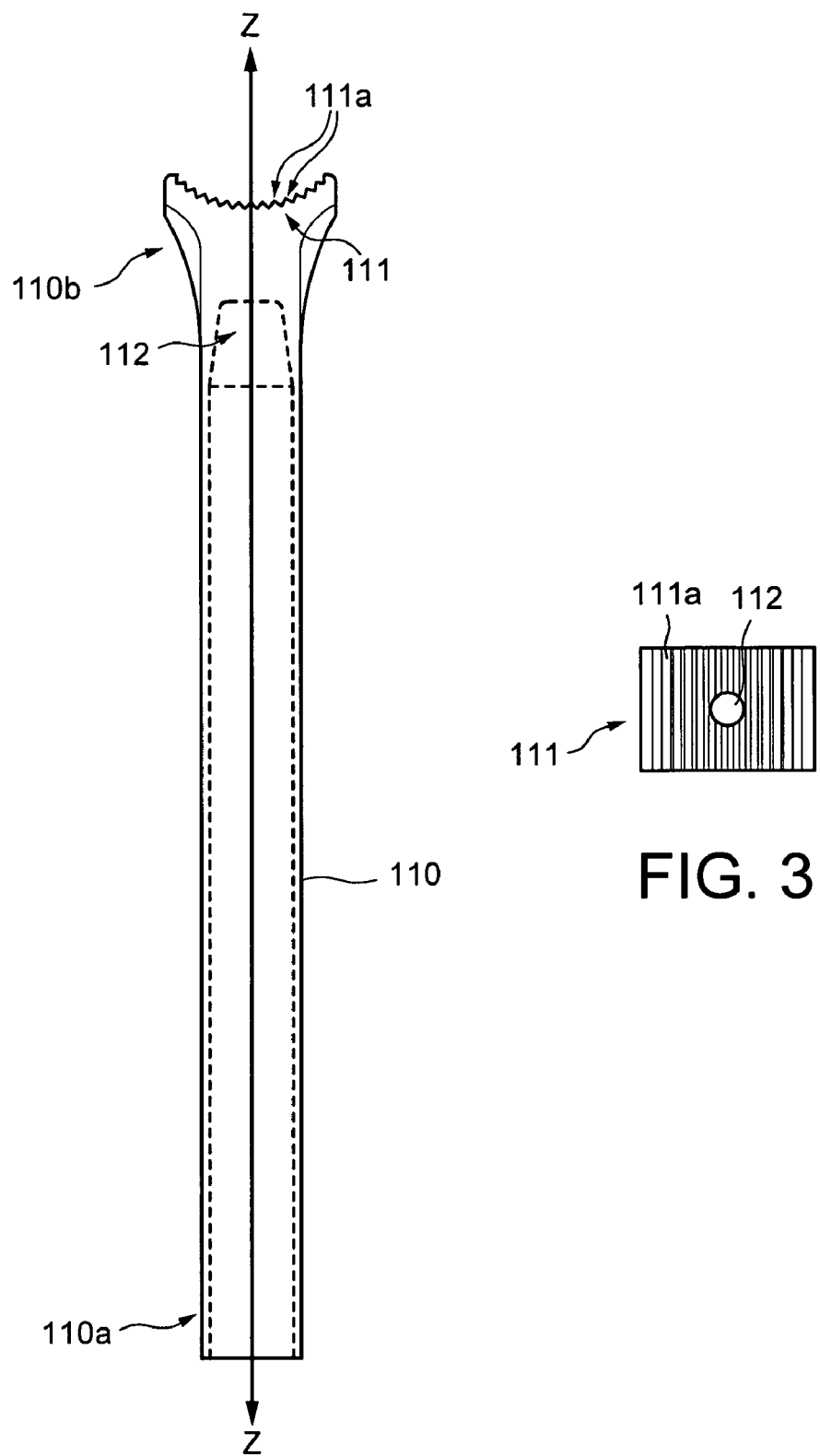

BICYCLE SEAT

CROSS-REFERENCE TO RELATED APPLICATION

This application is a continuation of and commonly owned U.S. patent application Ser. No. 10/655,241 entitled "BICYCLE SEAT ASSEMBLY," filed on Sep. 3, 2003 now U.S. Pat. No. 6,899,389.

FIELD OF INVENTION

This invention relates generally to bicycles and specifically to seats for bicycles.

BACKGROUND

As the popularity of bicycles increases, manufacturers and riders have sought to make bicycles that are stronger and more light-weight. Indeed, reducing the weight of a bicycle without comprising its strength can provide a rider with a competitive advantage. One area in which manufacturers have recently focused on to reduce bicycle weight is the seat, the seat post, and the assembly that connects the seat to the seat post.

Many popular seat designs include a seat post, upper and lower clamping members, a fastener, two parallel support rods, and a saddle. The upper and lower clamping members are attached to the seat post with the fasteners, and are adapted to clamp the two parallel support rods, which in turn are attached to a bottom portion of the saddle. Examples of such bicycle seat designs are disclosed in U.S. Pat. Nos. 5,244,301, 5,823,618, and 5,979,978, all of which are incorporated by reference herein. Although popular, these seat designs include a large number of parts, which not only results in the seat assembly being relatively heavy but also results in increased equipment and labor costs. In addition, because the fastening bolts used to attach the upper and lower clamping members to the parallel support rods are typically accessed from underneath the seat saddle, assembly can be cumbersome.

Other seat assemblies have been proposed that eliminate the parallel support bars and fasteners discussed above. For example, U.S. Pat. No. 4,568,121, which is incorporated by reference herein, includes a seat post having a serrated concave portion that mates with a convex serrated portion attached to the bicycle seat. However, the bolt that attaches the seat post to the seat is accessible only from beneath the seat, and is therefore somewhat cumbersome to attach or remove the seat from the seat post. In addition, the bolt is not aligned with the seat post, and therefore is exposed to lateral moments that can weaken the bolt and reduce the strength and durability of the seat assembly with use.

Thus, there is a need for a bicycle seat assembly that has a minimum number of parts, is light-weigh yet very strong and durable, and which allows for faster and more convenient assembly and disassembly.

BRIEF DESCRIPTION OF THE DRAWINGS

The features and advantages of the present invention are illustrated by way of example and are by no means intended to limit the scope of the present invention to the particular embodiments shown, and in which:

FIG. 2 is a side plan view of the seat post of the seat assembly of FIG. 1;

FIG. 3 is a top plan view of the seat post of the seat assembly of FIG. 1;

Like reference numerals refer to corresponding parts throughout the drawing figures.

DETAILED DESCRIPTION

Figure 1:
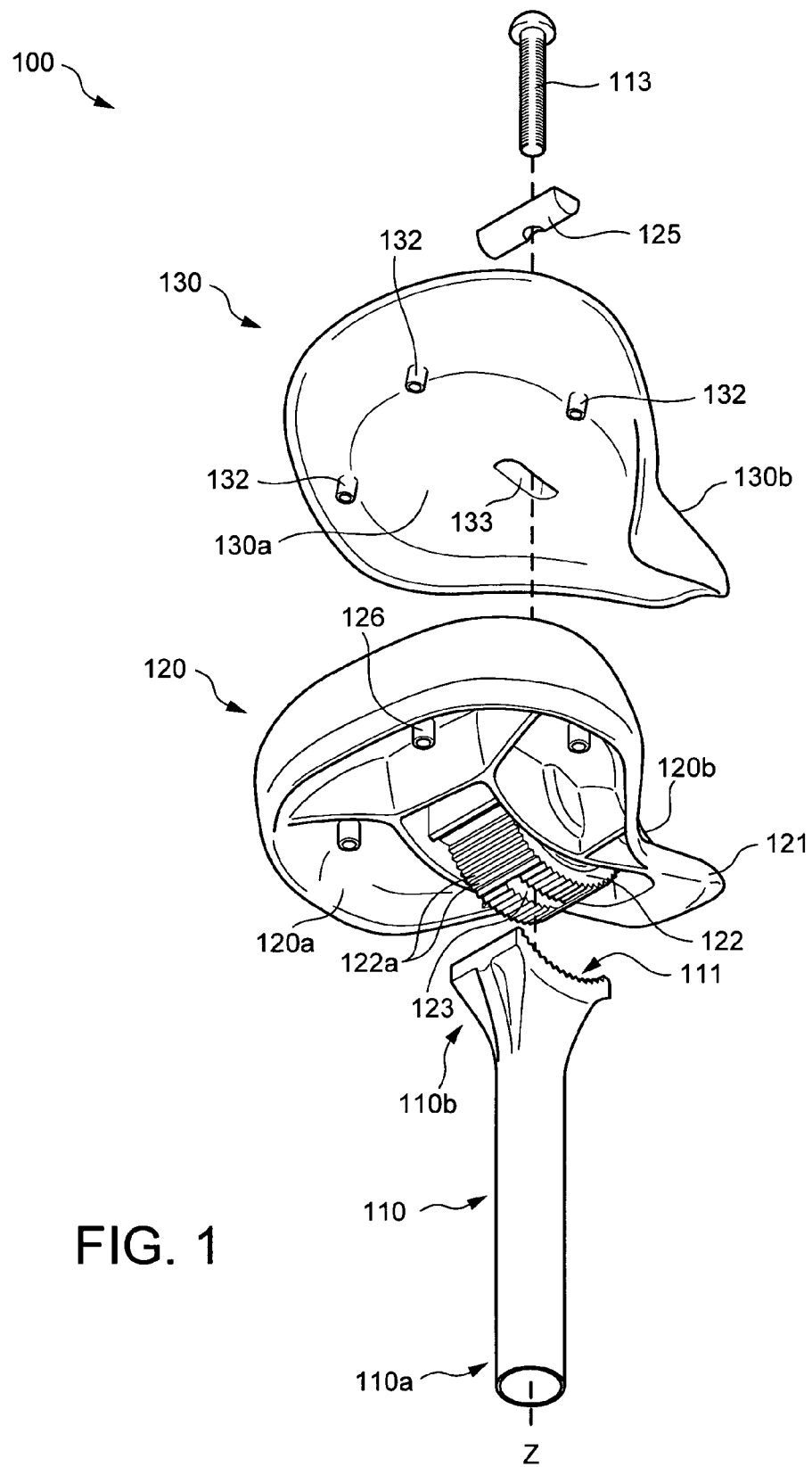
FIG. 1 is an exploded isometric view of a seat assembly in accordance with the present invention.
Figure 4A:
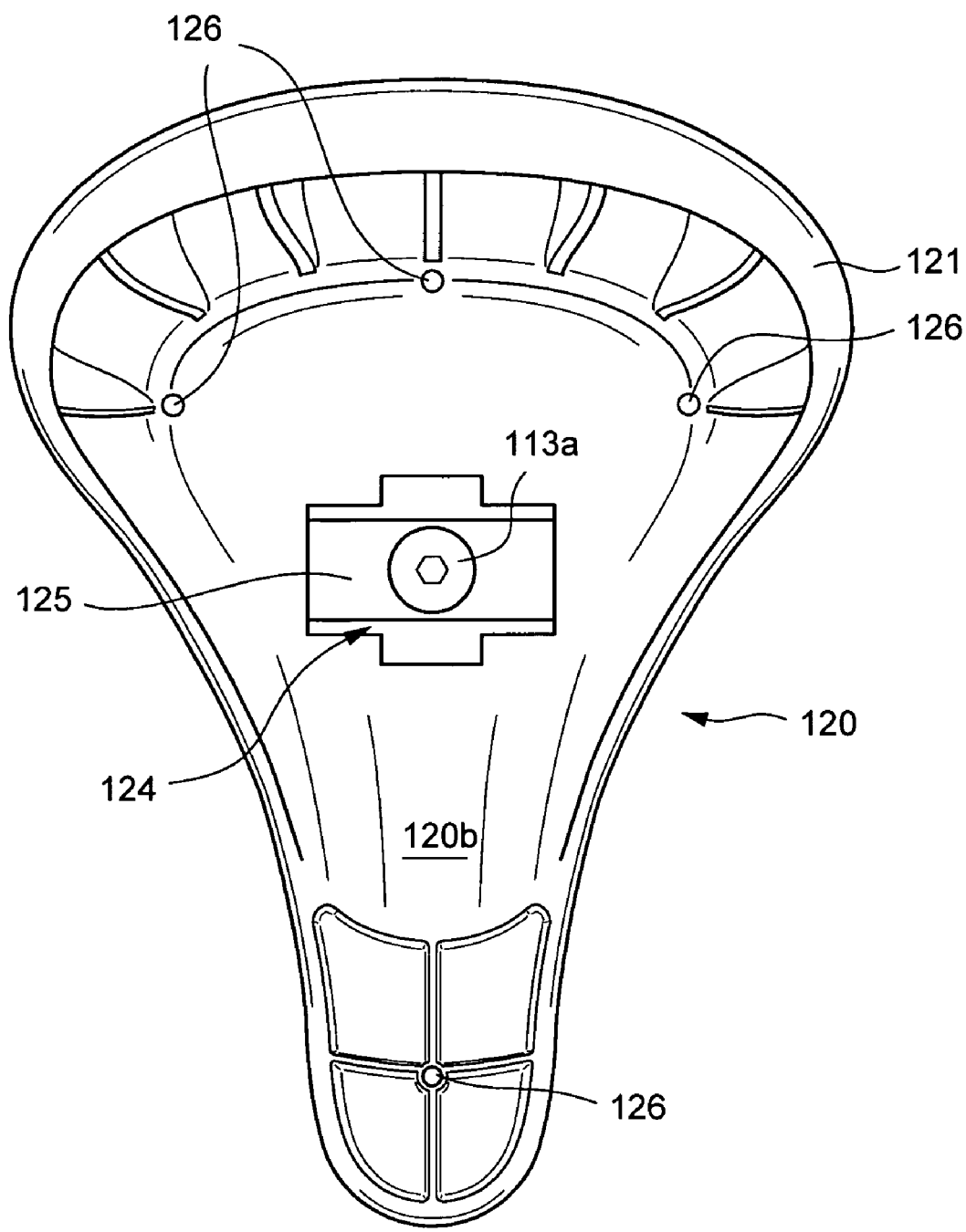
FIG. 4A is a top plan view of the saddle support structure of the seat assembly of FIG. 1.
Figure 4B:
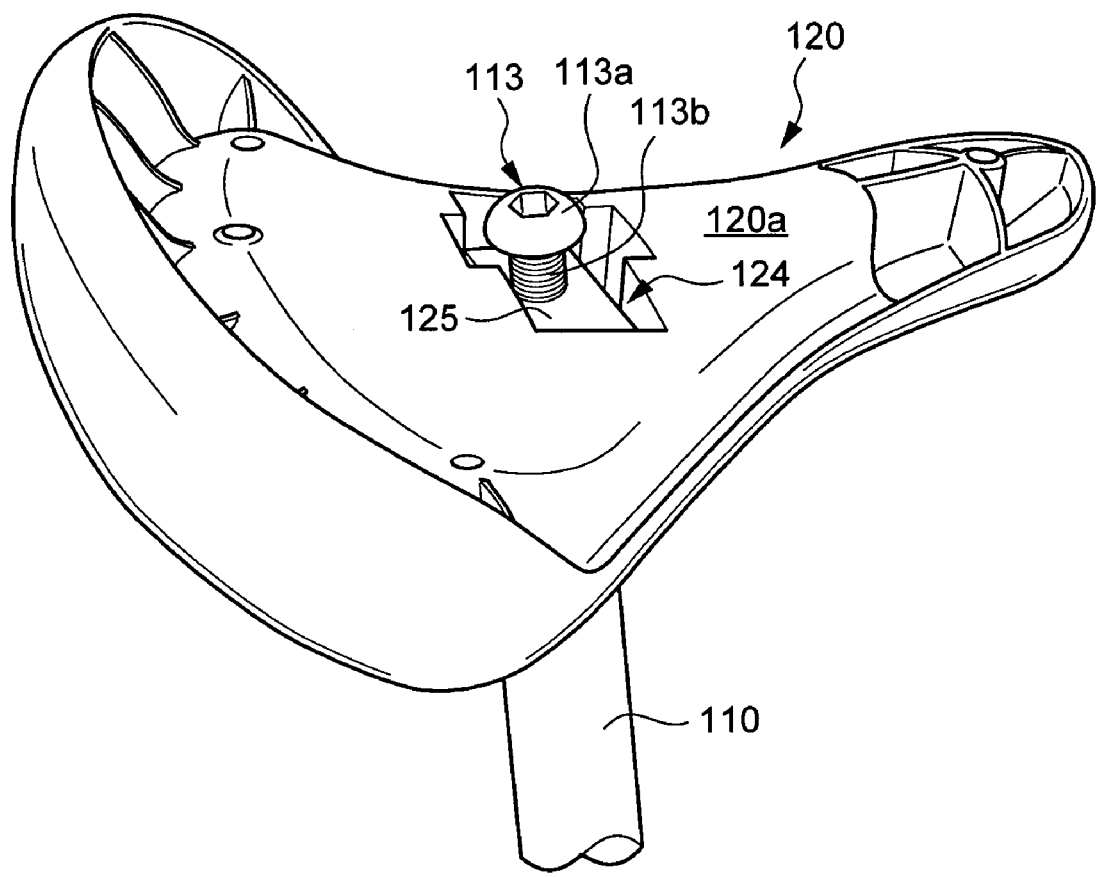
FIG. 4B is a side perspective view of the saddle support structure of the seat assembly of FIG. 1.
Figure 5:
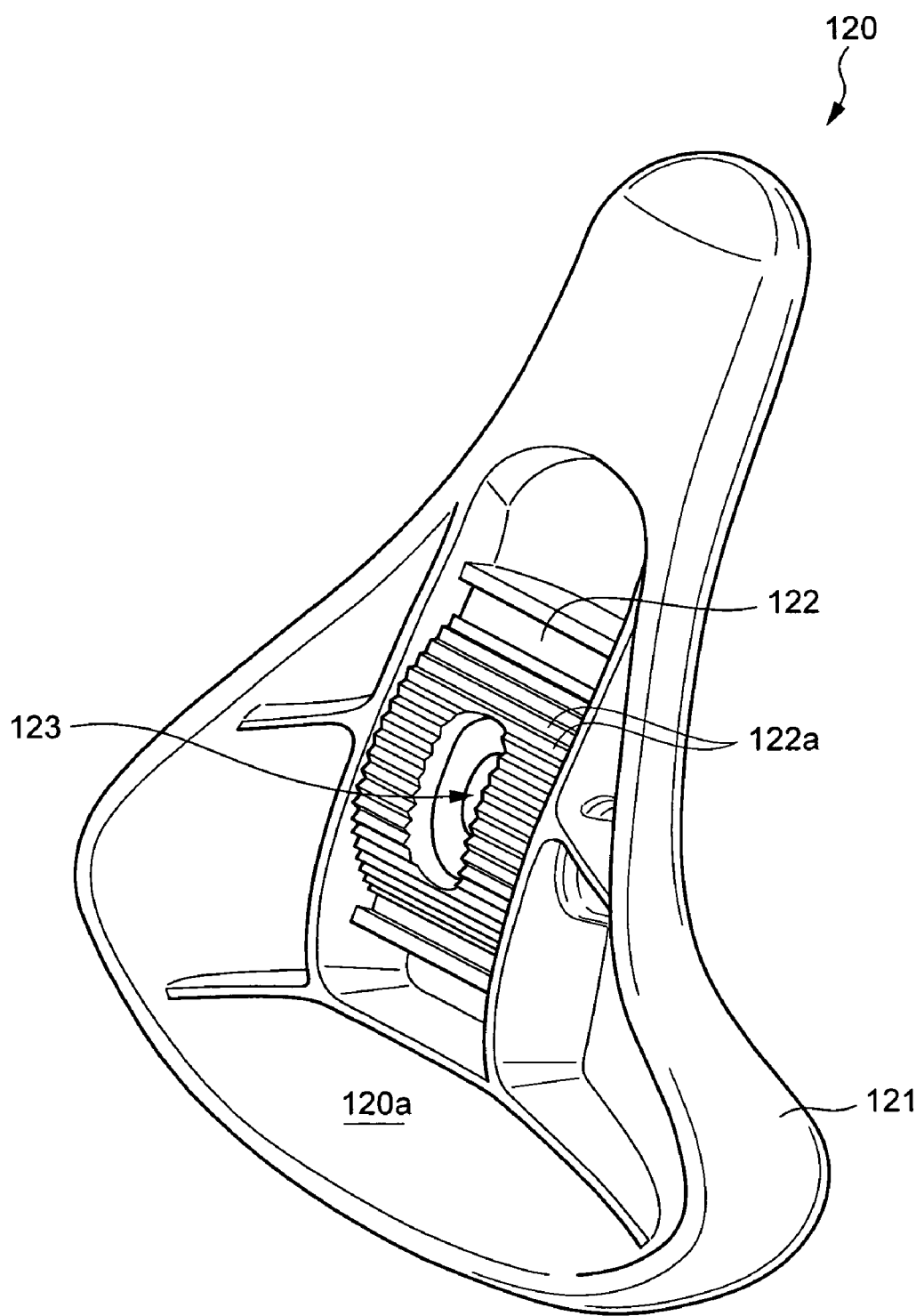
FIG. 5 is a bottom perspective view of the saddle support structure of the seat assembly of FIG. 1.

A bicycle seat assembly is described below that includes a fewer number of parts and weighs less than prior art bicycle seat assemblies without sacrificing strength or durability. Furthermore, the seat assembly of the present invention allows for faster and more convenient assembly and disassembly.

FIGS. 1–7 show a bicycle seat assembly 100 in accordance with one embodiment of the present invention. Seat assembly 100 includes a tubular seat post 110, a saddle support structure 120, and a saddle 130. Seat post 110 is characterized by a longitudinal axis Z extending through a central hollowed portion thereof, and includes a lower portion 110*a* adapted to be inserted into the seat post tube of an associated bicycle frame (not shown for simplicity), and an upper portion 110*b* adapted to mate with the saddle support structure 120. The upper seat post portion 110*b* widens to form a concave serrated surface 111 having a plurality of grooves 111*a* formed therein. For some embodiments, the grooves 111*a* formed on the upper serrated surface 111 are perpendicular to the longitudinal axis Z of the seat post 110. A threaded aperture 112 is formed in a central portion of the concave serrated surface 111 so as to align with the longitudinal axis Z of the seat post. The threaded aperture 112 is adapted to receive a bolt 113 having a threaded stem 113*a* and a head 113*a*. The threaded stem 113*a* is fitted to screw into the threaded aperture 112. When inserted into the threaded aperture, the bolt 113 has a co-axial relationship with the threaded aperture 112 and the seat post 110.

The seat post 110 can be made from any strong, durable, and lightweight material including, for example, a composite material, aluminum, alloys, titanium, or other materials, and can be of any dimensions suitable for use with a bicycle. For some embodiments, seat post 110 is aluminum forged using a 3-D fabrication process, although other fabrication methods can be used. For one embodiment, the seat post 110 has an outer diameter of approximately 2.5 cm, a wall thickness of approximately 3 mm, and a length of between approximately 20–25 cm, although for other embodiments seat post 110 can have other suitable dimensions. The cross-sectional shape of the seat post 110 can be any suitable shape that allows it to be inserted into the seat post tube of a bicycle. For some embodiments, the cross-sectional shape of the seat post 110 is circular, as illustrated in the figures.

For other embodiments, the cross-sectional shape of the seat post 110 can be rectangular, elliptical, triangular, octagonal, or some other suitable shape.

Further, the concave serrated surface 111 can have any number of grooves 111a formed therein, and can be of any suitable width and length. For some embodiments, the upper serrated surface 111 includes 14 grooves 111a, with the grooves 111a being approximately 3.5 cm long and spaced approximately 3 mm apart.

Saddle support structure 120 has a lower surface 120a and an upper surface 120b having a shape defined by an outer wall 121. A mating member 122 is attached to the lower surface 120a of the saddle support structure 120. The mating member 122 has a convex serrated surface including a plurality of grooves 122a that are adapted to mate with corresponding grooves 111a formed in the upper serrated surface 111 of the seat post 110, thereby preventing slipping between the seat post 110 and the saddle support structure 120 when the saddle support structure 120 is in contact with and secured to the seat post 110 via the bolt 113. For some embodiments, the mating member 122 is longer and includes more grooves 122a than the concave serrated surface 111 of the seat post 110 so that the saddle structure 120 can be rotated with respect to the seat post 110 to provide seat angle adjustments. Thus, for some embodiments, the grooves 111a formed in the seat post 110 can mate with any number of subsets of grooves 122a formed in the mating member 122 to adjust the relative angular positions of the seat post 110 and the saddle 130.

The mating member 122 and the saddle support structure 120 can be any suitable material. For some embodiments, the saddle support structure 120 is a composite plastic and/or resin material formed by injection molding, and the mating member is a composite material, alloy, metal, titanium, aluminum, or other rigid material formed using any well-known tooling process. The mating member 122 can be attached to the lower surface 120a of the saddle support structure 120 using any well-known technique. For some embodiments in which the saddle support structure 120 is a plastic material, the mating member 122 is attached thereto using well-known adhesive techniques such as gluing, bonding, and the like. For other embodiments in which saddle support structure 120 is a metallic material, the mating member 122 can be welded thereto. For still other embodiments, the mating member 122 can be formed as an integral (e.g., non-removable) part of the saddle support structure 120. For one embodiment, the mating member 122 is made of aluminum and is secured to support structure 120 via the bolt 113.

The mating member 122 has a slot 123 formed therein through which the bolt 113 can extend into the seat post 110. For some embodiments, the slot 123 is much longer than the diameter of the bolt 113 so that the mating member 122 and support structure 120 can be rotated into a plurality of positions with respect to the upper serrated surface 111 of the seat post 110, thereby allowing for seat angle adjustments. For one embodiment, the slot 123 is approximately 3 cm long and approximately 1 cm wide, although slot 123 can have other dimensions. An arcuate recess 124 is formed in the top surface 120b of the saddle support structure 120. The recess 124 includes an aperture aligned with the slot 123 formed in the mating member 122, and is adapted to receive a similarly shaped washer 125 through which the bolt stem 113b but not the bolt head 113a can extend. Washer 125 and bolt 113 can be formed of any suitable rigid and durable material. For one embodiment, the washer 125 and bolt 113 are formed of aluminum, although other materials can be used. For one embodiment, the bolt stem 113b is approximately 55 mm long and has a diameter of approximately 8 mm, and the bolt head 113a is approximately 18 mm wide and configured for use with a 5 mm allen wrench.

Saddle 130 has a lower surface 130a, an upper surface 130b, and a suitable cushioning material (not shown for simplicity) disposed therebetween. The upper surface 130b, onto which a rider sits, is a cover material such as vinyl or leather, although other suitable materials can be used. The lower surface of the saddle 130 can be any suitable rigid material. For some embodiments, the lower saddle surface 120b is made of a plastic and/or resin composite. For other embodiments, a metallic material such as an alloy, aluminum, titanium, and the like can be used. The lower saddle surface 130a is adapted to mate with the saddle support upper surface 120b such that saddle 130 securely rests within the saddle support structure 120.

The saddle's lower surface 130a can be attached to the saddle support structure 120 using any suitable technique. For some embodiments, a plurality of pegs 132 extending from the lower saddle surface 130a are received into corresponding recesses 126 formed in the saddle support structure's top surface 120b. The pegs 132 can be secured to corresponding recesses 126 using any suitable adhesive. For some embodiments, the saddle seat 130 can be attached to the saddle support structure 120 using gluing or bonding techniques. For other embodiments, the saddle seat 130 and support structure 120 can be fabricated as an integrated component.

Figure 6:
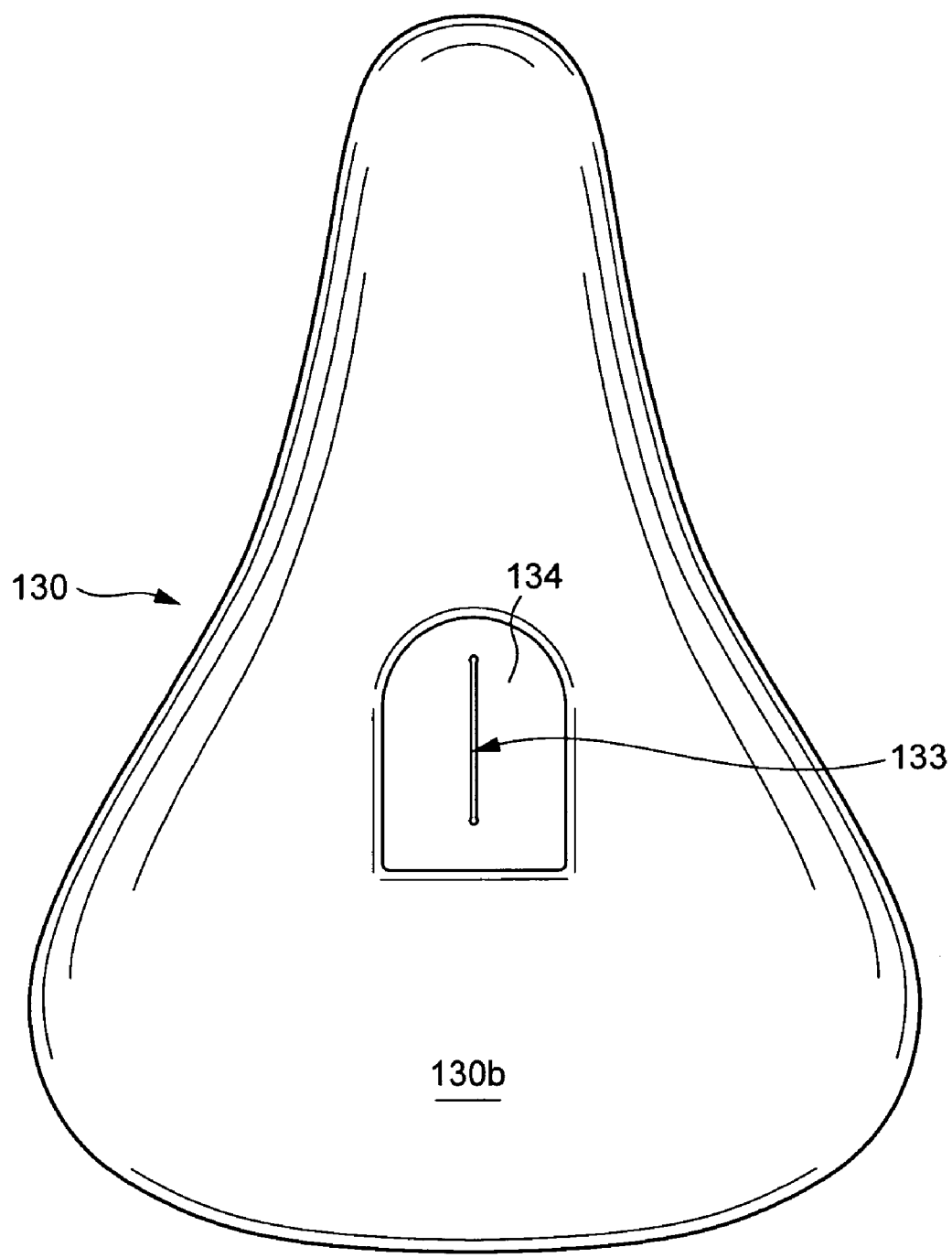
FIG. 6 is a top plan view of the saddle of the seat assembly of FIG. 1.
Figure 7:
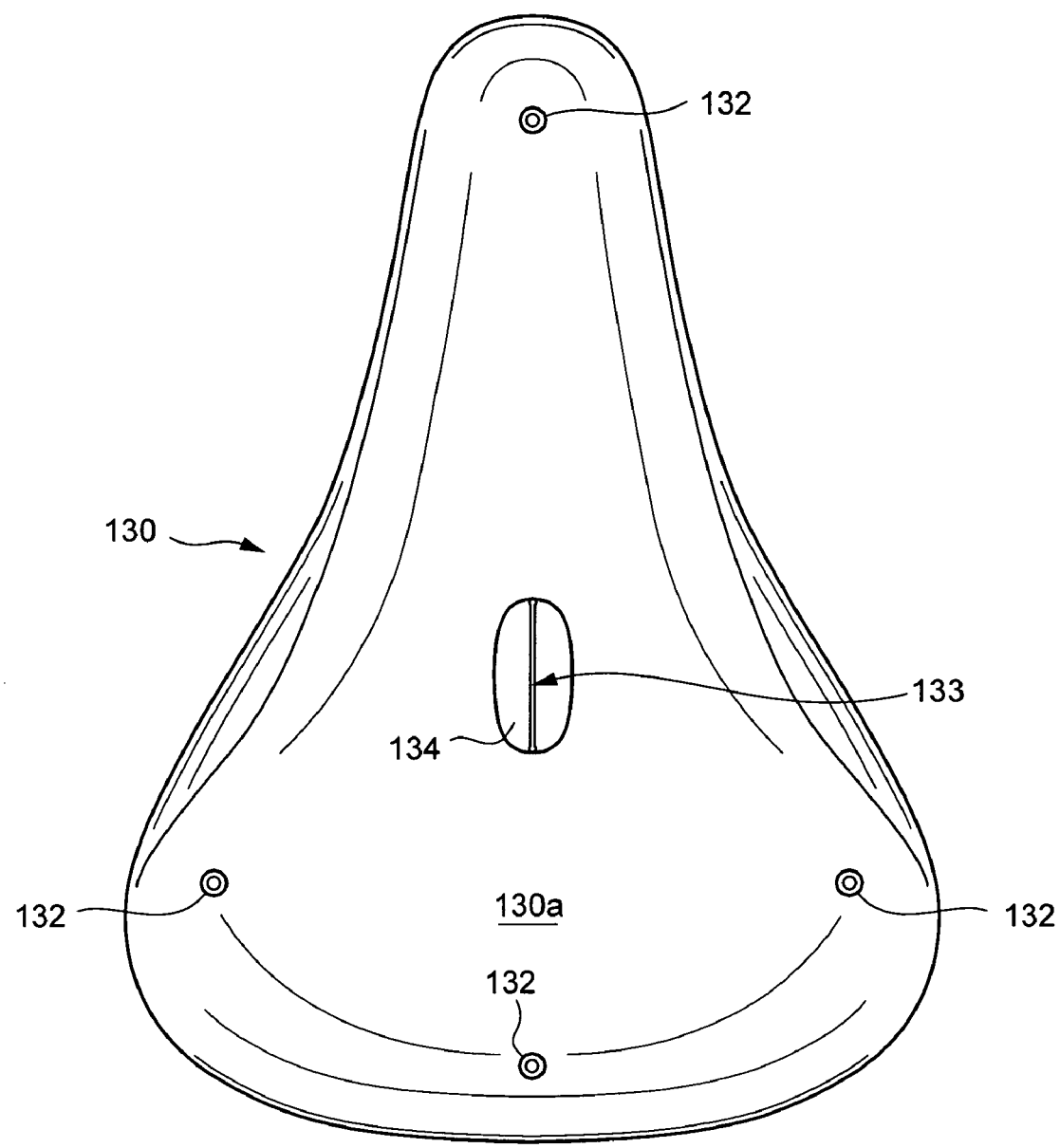
FIG. 7 is a bottom plan view of the saddle of the seat assembly of FIG. 1.

In accordance with the present invention, an opening 133 is formed in the saddle 130 through which the bolt 113 can be inserted and/or accessed to facilitate the attachment of saddle support structure 120 and saddle 130 to seat post 110, as well as to facilitate the removal of saddle 130 and support 120 from the seat post 110. In this manner, the opening 133 in the saddle 130 allows a rider to quickly and easily attach or remove the saddle 130 and support structure 120 from the seat post 110, or to sufficiently loosen the bolt 113 adjust the seat angle. For some embodiments, the opening 133 in the saddle's cover surface 130b is a slit formed in a panel 134 provided in the cover material 130b, as shown in FIGS. 6–7. The panel 134, which is made of a flexible material (e.g., rubber and the like) that is adapted to allow an elongated wrench (e.g., an allen wrench) to be inserted through the saddle 130 to engage bolt head 113a, substantially covers the opening 133 when in its natural state (e.g., when a wrench is not inserted through the panel). For some embodiments, the panel 134 can be eliminated, and the opening 133 can extend through the saddle cover material 130b. For other embodiments, the opening 133 can be any other suitable shape.

For example, a rider can easily adjust the angle of saddle 130 with respect to the bicycle (not shown) by simply inserting an elongated wrench (not shown) through the slit 133 in the saddle 130 to engage the bolt head 113a, loosening the bolt 113 until the bolt 113 disengages from the threaded aperture 112 in the seat post 110, re-positioning the support structure 120 with respect to the seat post 110 to achieve the desired seat angle, and then tightening the bolt 113 until the saddle 130 and support structure 120 are securely attached to the seat post 110. This is in marked contrast to prior art seat assemblies in which the fastening bolts are accessible only from beneath the seat assembly, which makes seat angle adjustments cumbersome.

For other embodiments, the slit 133 formed in the saddle 130 may be of other suitable shapes and/or sizes that allow access to the bolt 133 through (e.g., from above) the saddle 130. For one embodiment, the slit 133 is simply a hole formed in the saddle 130 through which the bolt 133 can be inserted into and/or removed from the threaded aperture 112 in the seat post 110.

Further, when screwed into the threaded aperture 112 in the seat post 110 through the slot 123 in the saddle support structure 120, the bolt 113 is aligned with the longitudinal axis Z of the seat post 110, which in turn maximizes the strength and durability of the seat assembly 100 because the bolt 113 is not exposed to any lateral moments (e.g., forces) during use. This is in marked contrast to the structures disclosed in U.S. Pat. Nos. 4,568,121, 5,244,301, and 5,823,618 in which the fastening bolt is not aligned with the seat post and is therefore undesirably exposed to lateral moments that can cause failure of the fastening bolt.

In addition, the seat assembly 100 of the present invention includes a minimum number of parts, which advantageously reduces manufacturing costs as well as labor costs associated with assembling the seat assembly 100. For example, reducing the labor costs associated with assembling seat assembly 100 allows a bicycle shop or manufacturer to build more seat assemblies 100 in less time, which in turn can advantageously reduce overhead and make the seat assembly 100 of the present invention a more attractive bicycle component than prior seat assemblies. Also, the minimum number of parts for seat assembly 100 also minimizes the weight of seat assembly 100, which can provide riders a competitive advantage. For one embodiment described herein, seat assembly 100 weighs approximately 1 pound.

Figure 8:
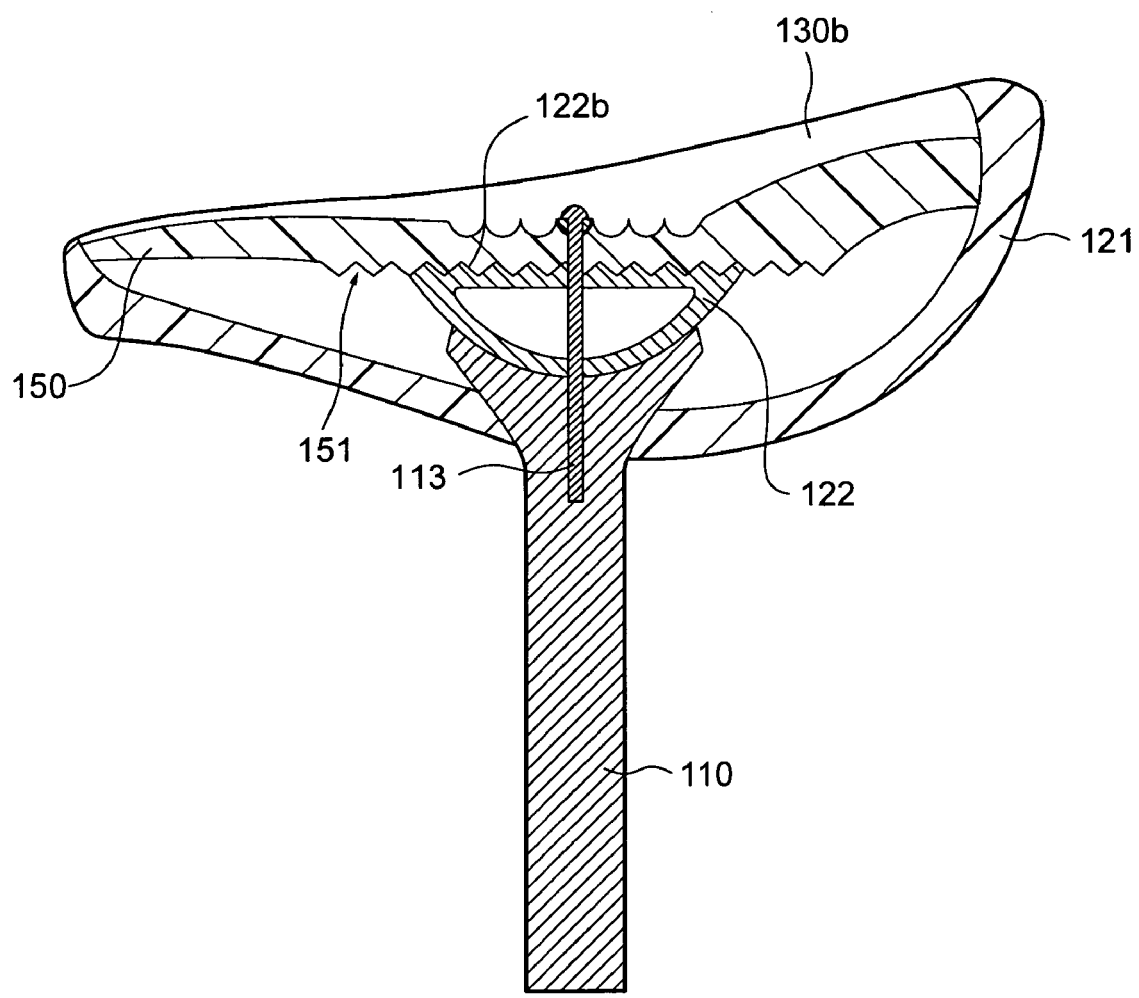
FIG. 8 is a side view of the saddle support structure in accordance with another embodiment of the present invention.

For other embodiments of the present invention, the saddle support structure 120 can include a horizontally oriented mating member 150 having a plurality of grooves 151 formed in a lower surface thereof that are adapted to mate with corresponding grooves 122b formed on a substantially planer (e.g., horizontal) top surface of a modified mating member 122, as illustrated in FIG. 8. The mating member 150 can be made of any suitable rigid and durable material, and can be attached to the saddle support structure 120 in any suitable manner. For such embodiments, mating member 122 is not fixedly attached to saddle support structure 120. For some embodiments, mating members 122 and 150 are made of the same material.

Mating member 150 has many more grooves 151 than grooves 122b formed on the top surface of mating member 122 so that the relative horizontal positions of mating members 122 and 150 can be adjusted by sliding mating member 122 with respect to mating member 150 such that grooves 122b of mating member 122 can mate with any number of subsets of grooves 151 in mating member 150. In this manner, the relative horizontal positions of the saddle 130 and the seat post 110 can be adjusted to bring the saddle 130 forward or backward, e.g., to bring the saddle 130 closer to or further from the associated bicycle's handle bars (not shown for simplicity). The ability to adjust the saddle 130 to various forward/backward positions is desirable to accommodate riders of different sizes and/or to accommodate different riding styles. For such embodiments, the slot 123 and opening 133 are sufficiently elongated such that the bolt 113 and the seat post 110 remain in a coaxial relationship, irrespective of the relative forward/backward position of the saddle 130 with respect to the seat post 110. In addition, as described above, the ability to access the bolt 113 through saddle 130 allows for quick and easy seat adjustments.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention. For one example, in other embodiments, the upper portion of the seat post can have a convex serrated surface and the saddle support structure's mating member can have a concave serrated surface. For another example, the upper surface of the seat post and the lower surface of the saddle structure's mating member are not serrated, e.g., their grooves are eliminated. Additionally, the shape of the saddle shown in the accompanying figures is merely illustrative; for other embodiments, the saddle can have other shapes.

What is claimed is:

1. A bicycle seating assembly comprising a seat, the seat including:
    a saddle support structure having a slot extending through the saddle support structure;
    a saddle adapted to mate with an upper surface of the saddle support structure, the saddle having formed therein a slit that is aligned with the slot in the saddle support structure; and
    a bolt having a threaded stem adapted to extend through the slit in the saddle and through the slot in the saddle support structure, the bolt having a head adapted to engage a top portion of the slot in the saddle support structure, wherein the head of the bolt is accessible only through the slit formed in the saddle, wherein the slit comprises a flexible panel that allows an elongated wrench to be inserted through the slit to access the head of the bolt, and the flexible panel substantially covers the slot.

2. The bicycle seating assembly of claim 1, further comprising:
    a tubular seat post characterized by a longitudinal axis and having a top surface adapted to mate with a bottom surface of the saddle support structure, the seat post having a threaded aperture formed therein along the longitudinal axis, wherein the threaded aperture is adapted to mate with the threaded stem of the bolt.

3. The bicycle seating assembly of claim 2, wherein the slit, the slot, the bolt, and the threaded aperture are coaxial.

4. The bicycle seating assembly of claim 2, wherein the saddle support structure is adapted to mate with the seat post in a plurality of different positions to provide a corresponding plurality of angles between the saddle and the seat post.

5. The bicycle seating assembly of claim 2, wherein the saddle support structure is adapted to mate with the seat post in a plurality of different positions to adjust the horizontal position of the saddle with respect to the seat post.

6. The bicycle seating assembly of claim 2, further comprising:
    a plurality of first grooves formed on a top surface of the seat post; and
    a plurality of second grooves formed on the bottom surface of the saddle support structure, the first and second grooves adapted to mate with each other.

7. The bicycle seating assembly of claim 1, wherein the saddle support structure includes a plurality of recesses adapted to mate with a corresponding plurality of pegs extending from a bottom surface of the saddle.

8. A bicycle seating assembly including a seat adapted to mate with a seat post, the seat comprising:
    a saddle support structure having a slot extending through the saddle support structure;
    a saddle adapted to mate with an upper surface of the saddle support structure, the saddle having a slit formed therein; and a bolt having a threaded stem adapted to extend through the slit in the saddle and through the slot in the saddle support structure, the bolt having a head adapted to engage a top portion of the slot in the saddle support structure, wherein the head of the bolt is accessible from above the saddle via the slit, the slit comprises a flexible panel that allows an elongated wrench to be inserted through the slit to access the head of the bolt, and the flexible panel substantially covers the slot.

9. The bicycle seating assembly of claim 8, wherein the seat post includes a threaded aperture adapted to receive the threaded stem of the bolt extending through the bottom surface of the saddle support structure.

10. The bicycle seating assembly of claim 8, wherein the seat post comprises a threaded aperture formed therein along a longitudinal axis of the seat post, the threaded aperture adapted to receive the threaded stem of the bolt.

11. The bicycle seating assembly of claim 10, wherein the slit, the slot, the bolt, and the threaded aperture are coaxial.

12. A bicycle seating assembly including a seat, comprising:
- a saddle having a top surface upon which a rider may sit;
- a slit formed in the saddle; and
- a bolt having a threaded stem adapted to extend through the slit in the saddle and to protrude beyond a bottom surface of the saddle for securing the saddle to a seat post, the bolt having a head adapted to engage a portion of the saddle, wherein the head of the bolt is accessible only through the slit formed in the saddle, the slit comprises a flexible panel that allows an elongated wrench to be inserted through the slit to access the head of the bolt, and the flexible panel substantially covers the slot.

13. The bicycle seating assembly of claim 12, wherein the seat post comprises a threaded aperture formed therein along a longitudinal axis of the seat post, the threaded aperture adapted to receive the threaded stem of the bolt.

14. The bicycle seating assembly of claim 13, wherein the slit, the bolt, and the threaded aperture are coaxial.

15. The bicycle seating assembly of claim 13, wherein the seat further comprises:
- a saddle support structure having a top surface adapted to mate with a bottom surface of the saddle, a bottom surface adapted to mate with a top surface of the seat post, and a slot formed therein through which the threaded stem of the bolt can extend from the saddle to the seat post.

* * * * *